April 24, 1962     T. WERNER     3,030,977
VALVE STRUCTURE
Filed Jan. 27, 1960     2 Sheets-Sheet 1
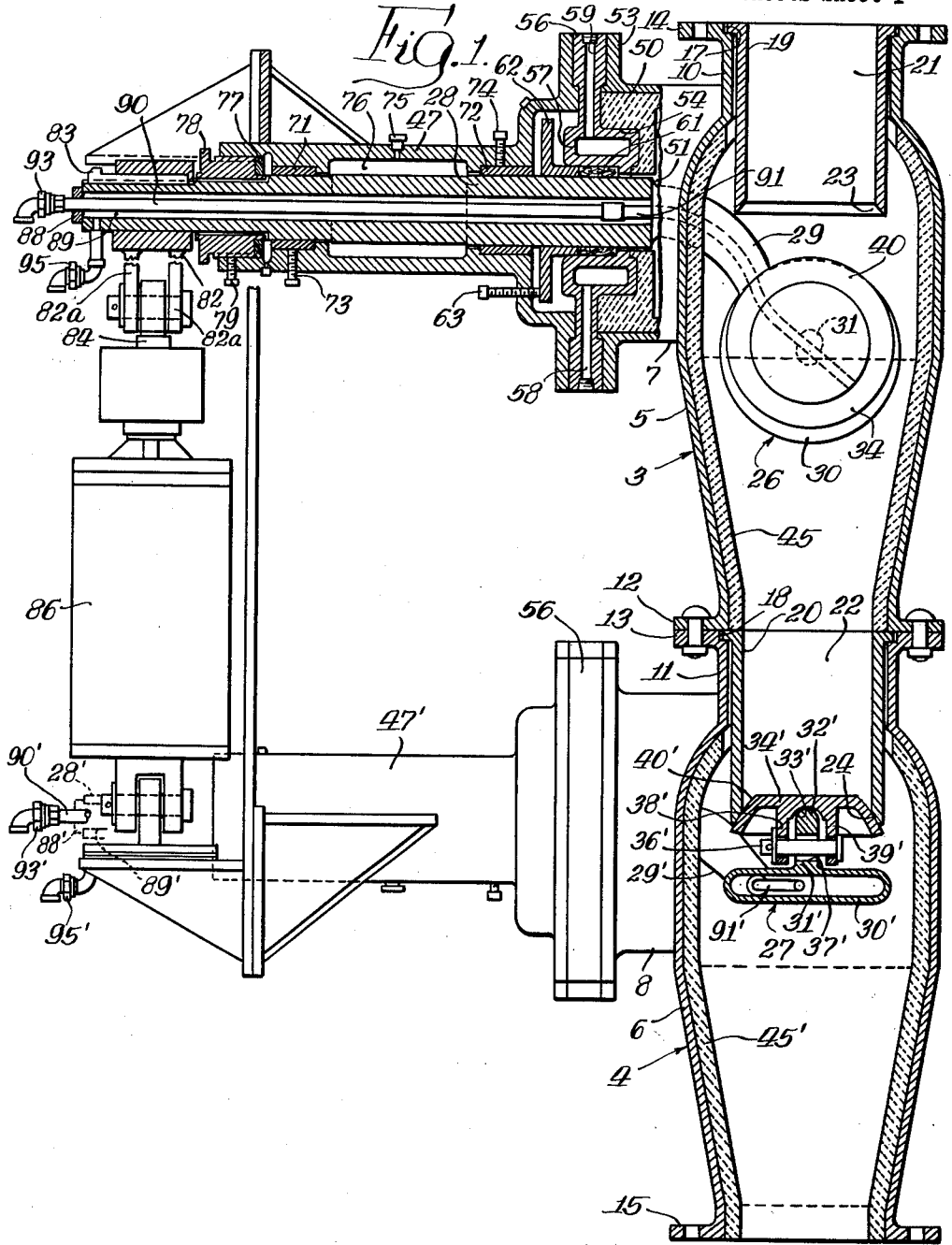
INVENTOR.
Tage Werner
BY Davis, Lindsey, Hibben & Noyes
Attys.

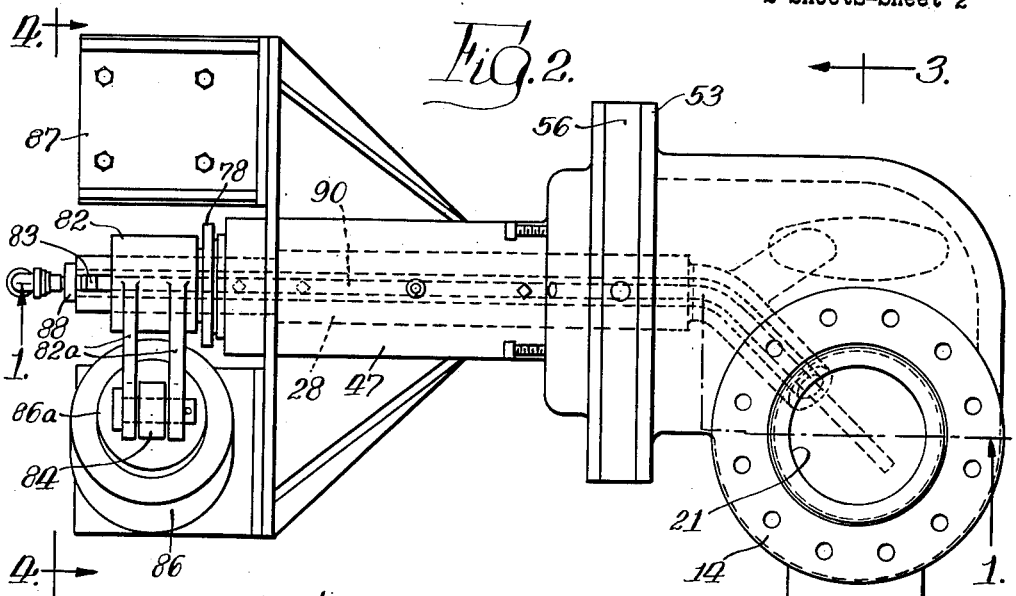
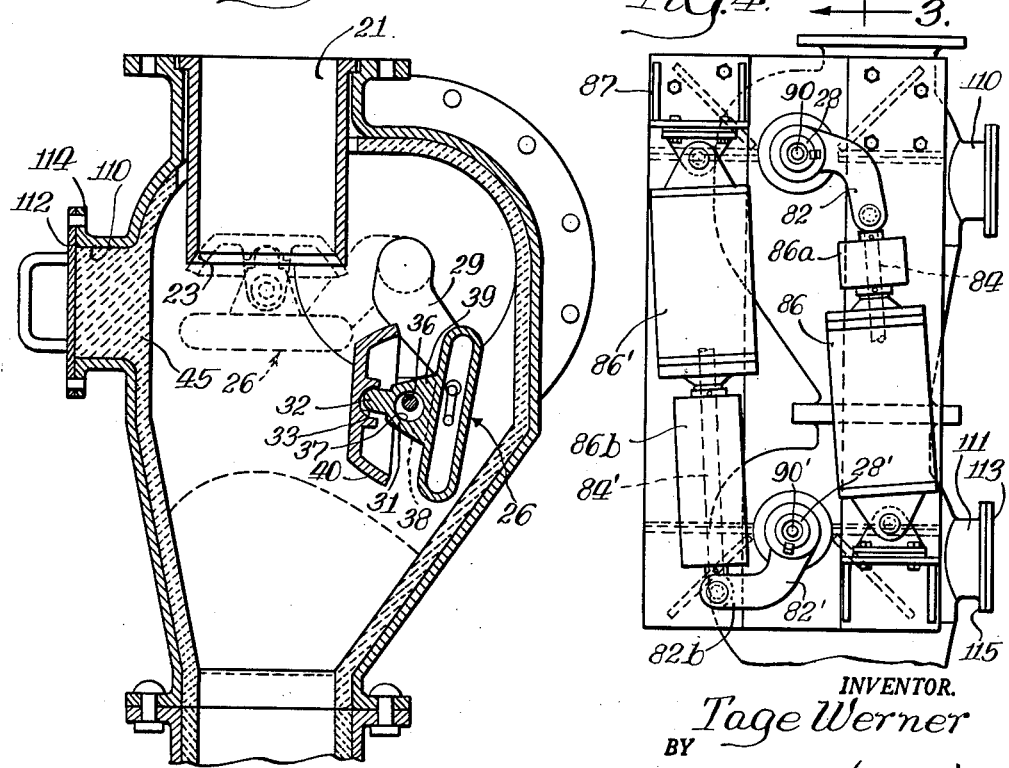

United States Patent Office 3,030,977
Patented Apr. 24, 1962

3,030,977
VALVE STRUCTURE
Tage Werner, Rocky River, Ohio, assignor, by mesne assignments, to Inland Steel Company, Chicago, Ill., a corporation of Delaware
Filed Jan. 27, 1960, Ser. No. 4,956
7 Claims. (Cl. 137—340)

The present invention relates generally to valve structures for controlling the flow of materials which are themselves heated to a high temperature or which are being moved into a high-temperature zone. The present invention is particularly concerned with providing an improved valve structure for use in controlling the flow of material in a metallurgical process, such as the flow of iron ore into a heated reducing chamber, or the flow of hot reduced iron ore into a high-temperature melting hearth.

In one type of process for the production of iron directly from iron ore without the use of a conventional blast furnace, iron ore which is preferably in at least a partially reduced form is charged directly into a high-temperature melting hearth wherein the ore is finally reduced with carbon to metallic iron and melted to a fluid mass. The melting hearth must be maintained at a relatively high temperature to melt the iron. The high temperature required is generally produced by burning a carbonaceous fuel with oxygen-enriched air, or pure oxygen within the hearth zone.

It is evident that in order to effect economical operation of a metallurgical process of the foregoing type, it is necessary to supply the required iron ore, carbonaceous fuel, and other solid ingredients, to the high-temperature melting hearth continuously or at frequent intervals. It is also essential that the combustion gases formed during the process be properly controlled to prevent escape into the surrounding atmosphere. Both these requirements dictate that the supply valve structures used for feeding the materials to the melting hearth, for example, or for closing any opening through a hearth wall be specially constructed to resist the effects of the high temperatures existing within the hearth. Also, any valve structure used for controlling the flow of ore or other solid materials into the hearth must also have its essential parts protected against excessive abrasion or corrosion.

Accordingly, it is an object of the present invention to provide an improved closure means for providing convenient and safe access to a high-temperature zone within a heated enclosure.

It is another object of the present invention to provide an improved valve structure adapted to be used in association with high-temperature metallurgical equipment.

A further object of the present invention is to provide an improved fluid cooled valve structure.

Still another object of the present invention is to provide a more economical fluid cooled valve structure in which the valve head element is protected by continuously circulating water but does not itself have fluid passages extending therethrough.

It is a still further object to provide an improved fluid cooled valve structure for controlling the flow of high-temperature, abrasive materials having relatively inexpensive, readily replaceable, valve seat and valve head elements.

Other objects of the present invention will be apparent from the detailed description and claims to follow, when read in conjunction with the accompanying drawing, wherein:

FIGURE 1 is a vertical sectional view partially in side elevation of the valve structure of the present invention as taken along the line 1—1 of FIG. 2;

FIG. 2 is a top plan view of the valve structure shown in FIGURE 1;

FIG. 3 is a fragmentary vertical sectional view along the line 3—3 of FIG. 2; and FIG. 4 is a fragmentary end elevational view of the valve structure of the present invention showing operating mechanism therefor as seen along the line 4—4 of FIG. 2.

In FIGURE 1 of the drawing is shown a pair of valves 3 and 4, each having a hollow, generally bell-like body section 5, 6, respectively, with each said body section having a transversely extending valve stem accommodating section 7, 8 and a longitudinally extending cylindrical inlet section 10, 11, respectively. The valve bodies 5, 6 are disposed one above the other in axial alignment with the flange 12 on the lower end of the upper valve body 5 and the flange 13 on the upper end of the lower valve body 6 joined to form a unitary double valve body assembly. The flange 14 on the upper valve body 5 and the flange 15 on the lower valve body 6 are adapted to be connected with suitable conduits (not shown) which communicate, for example, with a source of iron ore and a melting hearth, respectively.

Seated in the circular recesses 17, 18 in the upper end or inlet opening of each of the valve bodies 5, 6, respectively, are the removable cylindrical valve seat members 19, 20, respectively, which extend downwardly into the interior of the respective valve bodies, 5, 6 and which provide cylindrical, axial aligned inlet passages 21, 22, respectively. Each of the valve seat members 19, 20 is provided on the lower edge thereof with an outwardly and downwardly tapering surface which provides valve seat surfaces 23, 24, respectively.

The inlet passages 21, 22 in the upper or inlet ends of the respective valve bodies 5, 6 are capable of being closed by valve seat closure assemblies 26, 27, respectively (see FIGS. 1 and 3), which are adapted to seat on the valve seat surfaces 23, 24, respectively. In FIG. 1 the valve assembly 26 is shown in open position and the valve assembly 27 is shown in closed position. The valve closure assemblies 26, 27 have identical construction and are mounted on the ends of the valve shafts 28, 28', respectively. The valve assemblies 26, 27 comprise hollow valve stems in the form of lever arms 29, 29' secured to the inner end of hollow rotatable valve shafts 28, 28', respectively. The ends of the lever arms 29, 29' are enlarged transversely to form hollow, enlarged valve stem sections or shields 30, 30', respectively, having a diameter preferably equal to or greater than the diameter of the respective valve seat surfaces 23, 24 and also at least equal to or greater than the diameter of the valve heads or valve seat closure elements 34, 34', respectively, which are supported thereby. Extending upwardly from the center of the upper surface of shields 30, 30' are studs 31, 31', respectively. The studs 31, 31', are preferably disposed in axial alignment with the longitudinal axis of the valve seat members 19, 20, respectively, when the valves are in closed position. The studs 31, 31' provide rounded or ball support means 32, 32', respectively, for the sockets 33, 33' formed in the valve heads 34, 34', respectively. The valve heads 34, 34' are loosely mounted on studs 31, 31', respectively, and are preferably connected with the valve support means 32, 32', respectively, by means of pins 36, 36', respectively, which extend through enlarged passages 37, 37' in the said studs and are supported at the opposite ends thereof by apertured lugs or ears 38, 39, and 38', 39', respectively, which extend from the valve heads 34, 34', respectively. The ball and socket connections between the studs 31, 31' and the valve heads 34, 34 (facilitate accurate seating of the respective valve head in the valve seat with which it is associated despite slight misalignment or wear due to abrasion or corrosion. The valve heads 34, 34' are each preferably provided with a segmental annular surface 40, 40', respectively, which provide for seating engagement with the valve seats 23, 24, respectively. The inner exposed surfaces of the valve body sections 5, 6 are also preferably provided with protective coatings 45, 45', respectively, comprised of an abrasive resistant refractory material.

The cylindrical valve stem accommodating sections 7, 8 which extend transversely from one side of the respective valve body sections 5, 6, and each having an axial passage of sufficient diameter to permit passage therethrough of the shield 30, 30' and valve heads 34, 34', respectively, are arranged eccentrically with respect to the longitudinal axis of the said valve body sections 5, 6. Thus, with the valve shafts 28, 28' and the valve lever arms 29, 29', respectively, pivotally mounted axially in sections 7, 8, respectively, the valve heads 34, 34' are brought into seating engagement with the valve seat surfaces 23, 24, respectively, when the valve lever arms 29, 29' are moved to the upper or "closed" position and are entirely clear of the valve seat surfaces 23, 24 and the valve entry passages 21, 22, respectively, when moved to the lower or "open" position (see FIG. 3). It is evident that an unobstructed path between the upper and lower ends of the valve body sections 5, 6 is provided if the valve lever arms associated therewith are in "open" position. As shown in FIG. 1, however, it is preferred to have the lower valve in "closed" position when the upper valve is in "open" position, and the upper valve in "closed" position when the lower valve is in "open" position. Thus, a double lock arrangement is provided for feeding successive batches of ore or other solids from one zone to another without allowing direct fluid communication between the two zones.

The mounting assembly for each of the valve shafts 28, 28' is identical and FIG. 1 best illustrates the mounting with respect to the valve shaft 28, wherein the mounting assembly comprises a cylindrical heat insulating disk or lining section 50 made of suitable refractory material which is associated with a fluid cooled jacket section 56 and extends into the open ends of the cylindrical valve stem accommodating section 7. The disk or lining section 50 has an axial passage 51 adapted to accommodate the valve shaft 28. The jacket section 56 is held securely between the flange 53 of the section 7 and the valve shaft housing section 47. The jacket section 56 has a hollow circular ring section 57 disposed concentrically about the shaft 28 with the inner diameter of the ring section 57 being sufficient to accommodate therein the valve shaft 28. The ring section 57 is hollow so that it provides a fluid passage which is adapted to receive a cooling fluid through an inlet passage 58 and to discharge cooling fluid therefrom by means of an outlet passage 59, said passages 58, 59 extending radially from the ring section 57 on diametrically opposed sides thereof. The ring section 57 has the inner wall surface spaced from the shaft 28 at one end thereof to receive a heat-resistant packing 61 which is held in place by a gland 62 and associated set screws 63 mounted in the valve shaft housing section 47.

The valve shaft 28 is journaled in the valve shaft housing section 47 by spaced bushings 71, 72 positioned in suitable recesses in opposite ends of the axial passage extending through the housing section 47, said bushings being positioned therein by set screws 73, 74, respectively. A valve shaft lubricating well 76 is formed in the inner wall of the housing 47 between the bushings 71, 72 and is fed through a grease fitting 75. The outer end of the housing 47 is provided with a washer 77 and a spacer 78 mounted over the shaft 28 and held in position by a set screw 79. The valve shaft 28' is journaled in the valve shaft housing 47' in the same manner as shaft 28.

The valves 3 and 4 are controlled independently by operating levers 82, 82' (FIG. 4), respectively, which are affixed to the outer end portions of the valve shafts 28, 28', respectively, and are keyed thereto by means of locking keys, as shown at 83. Each of the operating levers 82, 82' has clevis-type arms 82a and 82b, respectively, extending outwardly which are secured to the end of hydraulic cylinder piston rods 84, 84', respectively, said piston rods being movable inwardly and outwardly by the hydraulic cylinders 86, 86', respectively, which are pivotally anchored to the supporting frame 87 of the valve support means. The piston rods 84, 84' are preferably covered by protective canvas boots 86a and 86b, respectively.

The hollow valve shafts 28, 28' each have the outer ends thereof closed by suitable caps 88, 88' which support lengths of stainless steel pipes 90, 90', respectively, axially within and spaced from the inner wall surfaces of the said shafts to provide a fluid inlet passage and an annular fluid outlet passage thereabout, as shown at 89 and 89'. Adjacent the outer ends of the lever arms 29, 29', the pipes 90, 90' connect with lengths of stainless steel flexible coolant hose 91, 91', respectively, having the inner ends open to permit cooling fluid to discharge therefrom. The flexible hoses 91, 91' pass through the lever arms 29, 29' preferably spaced from the inner wall surfaces and extend into the enlarged valve stem sections or shields 30, 30', respectively, to provide fluid inlet means for conducting cooling fluid into the valve shields 30, 30', respectively. Suitable fluid coupling members 93, 93' are secured to the outer ends of pipe sections 90, 90', respectively, and are adapted to be connected with a source of cooling fluid. The valve shafts 28, 28' also have coupling means 95, 95', respectively, mounted on the outer lateral surfaces thereof which are associated with the fluid outlet passages 89, 89', respectively, extending through the lateral walls thereof in communication with the said annular fluid outlet passages formed within the shafts 28, 28'; whereby cooling fluid is capable of being continuously circulated through the valve shafts 28, 28'; the valve lever arms 29, 29'; and the shields 30, 30'.

The valve body sections 5, 6 are also provided with lateral openings 110, 111 (FIGS. 3 and 4) which permit access to the interior of the valves 3, 4, respectively, without disconnecting the valve inlet and outlet ends. The lateral openings 110, 111 are provided with cover plates 112, 113, respectively, which are removably connected with the flanges 114, 115, respectively.

In operation, the valves 3 and 4 are normally maintained in closed position by the hydraulic cylinder piston rods 84, 84'. When it is desired to introduce iron ore from an ore reduction column to a melting hearth, for example, the hydraulic piston 86 moves lever arm 82 downwardly so as to rotate valve shaft 28 and remove the valve seat closure element 34 from valve seat 23 into "open" position, as shown in FIG. 3. The valve 4 during the opening of valve 3, is maintained in the closed position. With valve 3 open and valve 4 closed, iron ore flows into the valve 3 until the valve body 5 is substantially filled with iron ore. Thereupon, valve 3 is moved to closed position by hydraulic cylinder 86 and the associated elements. As soon as valve 3 is closed, valve 4 is moved to open position by hydraulic cylinder 86' rotating valve shaft 28' to remove the valve seat closure 34' from the valve seat 24. The iron ore in valve 3 then flows downwardly through valve 4 into the melting hearth. Since valve 3 remains in the closed position when valve 4 is open, gases and heat from the melting hearth are prevented from escaping through the inlet opening of valve 3.

It will be evident that when the valve 4 is closed, the shield 30' through which cooling fluid continuously flows, protects the valve seat closure element 34' and the valve seat 24 from direct exposure to heat from the melting hearth. Similarly, when valve 4 is open and valve 3 closed, the shield 30 through which a cooling fluid, such as water, continuously flows, protects the valve seat closure element 34 and the valve seat 23 from direct exposure to heat from the melting hearth. It will also be evident that the valve seats 23, 24 and the valve seat closure elements 34, 34' can be easily replaced without having to replace the more costly fluid cooled elements of the valve assembly, thereby further reducing the cost of construction and maintenance of the valve assembly.

Others may practice the invention in any of the numerous ways which are suggested to one skilled in the art, by this disclosure, and all such practice of invention are considered to be a part hereof which fall within the scope of the appended claims.

I claim:

1. A fluid-cooled valve structure comprising a valve body having a valve seat therein, a tubular valve stem extending into said valve body and terminating in an enlarged hollow shield portion, a valve head detachably mounted on said shield portion, means pivotally supporting said tubular valve stem for movement of said valve head into and out of engagement with said valve seat, and means for circulating a cooling fluid through said tubular valve stem and said hollow shield portion whereby said valve seat and said valve head are protected from heat by the cooled shield portion when the valve is closed.

2. A valve structure substantially as in claim 1 wherein said enlarged hollow shield portion of the said valve stem is in the form of a hollow disk which has a diameter at least equal that of the said valve head which is detachably mounted on one side thereof in substantially spaced relationship therewith.

3. A valve structure as in claim 2 wherein the said valve head is pivotally mounted on said hollow disk.

4. In a valve structure, the improvement comprising a valve body having an opening with a valve seat member arranged therein, a valve seat closure assembly movably mounted within said valve body and adapted to close said opening by engaging said valve seat member, said valve seat closure assembly having a tubular valve stem mounted for limited rotatable movement within said valve body and having a hollow enlarged end section, said enlarged end section having a valve seat closure element spaced from said end section and detachably supported thereby, said valve stem having a cooling fluid inlet passage and return fluid passage therethrough, and said enlarged end section having a diameter at least as large as that of the said valve seat closure element; whereby the valve seat closure element and valve seat member are protected against direct exposure to heat with the valve in closed position.

5. In a fluid-cooled valve structure, the improvement comprising a valve body having an inlet opening and a longitudinally spaced outlet opening, said inlet opening having therein a valve seat member, and a valve seat closure assembly pivotally mounted in said valve body eccentrically with respect to the longitudinal axis of said valve body and rotatable about an axis perpendicular to said longitudinal axis, said valve closure assembly comprising a hollow valve shaft having a tubular valve lever arm secured on one end thereof and extending into the interior of said valve body, said lever arm having said end threof enlarged forming a generally flat hollow valve seat closure shield, said valve seat closure shield having a support means thereon detachably supporting in spaced relationship with said shield a valve seat closure element engageable with said valve seat member and having a width at least as large as that of the said valve seat closure element, a fluid conduit means extending through the said valve shaft and valve lever arm into the valve seat closure shield having fluid inlet and outlet passages.

6. A valve structure as in claim 5 wherein the valve seat member is detachably mounted in the valve inlet opening and the said valve seat closure element is detachably mounted on a valve seat closure support element extending axially outwardly from the surface of the said shield; whereby said valve seat member and said valve closure element can be readily replaced without replacing the fluid-cooled valve lever arm and closure shield thereof.

7. An improved fluid-cooled valve structure comprising a valve seat closure assembly movably disposed in a valve body section for opening and closing a valve seat member disposed therein, said valve closure assembly having a valve operating shaft pivotally mounted in a valve shaft housing section operatively associated with said valve body section through a transverse opening in the said housing section, said valve shaft housing section being spaced from said body section by a heat insulating section which extends over the interior of said valve body section and the interior surface of said transverse opening, and said valve shaft housing section having an axial passage therethrough adapted to receive said valve shaft, and a fluid-cooled jacket section disposed in contact with the outer surface of said insulating section between the said insulating section and said valve shaft housing which encompasses said valve shaft and which is adapted to have cooling fluid continuously circulated therethrough.

References Cited in the file of this patent

UNITED STATES PATENTS

| 464,195 | Forter | Dec. 1, 1891 |
| 610,076 | McClure | Aug. 30, 1898 |
| 2,467,945 | Pottmeyer | Apr. 19, 1949 |
| 2,900,995 | Dickerson | Aug. 25, 1959 |